United States Patent

Goyal

(10) Patent No.: US 8,214,328 B2
(45) Date of Patent: Jul. 3, 2012

(54) HIGH-PERFORMANCE ASYNCHRONOUS PEER-TO-PEER REMOTE COPY FOR DATABASES

(75) Inventor: Pawan Goyal, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 1383 days.

(21) Appl. No.: 10/721,602

(22) Filed: Nov. 25, 2003

(65) Prior Publication Data

US 2005/0114407 A1    May 26, 2005

(51) Int. Cl.
G06F 7/00 (2006.01)
G06F 17/00 (2006.01)
G06F 13/00 (2006.01)

(52) U.S. Cl. .................. 707/613; 707/625; 711/162

(58) Field of Classification Search .......... 707/204, 707/202, 613, 625; 714/7, 18; 711/162
See application file for complete search history.

(56) References Cited

U.S. PATENT DOCUMENTS

| | | | |
|---|---|---|---|
| 5,623,599 A * | 4/1997 | Shomler | 714/18 |
| 5,742,792 A * | 4/1998 | Yanai et al. | 711/162 |
| 5,933,838 A | 8/1999 | Lomet | |
| 5,983,361 A | 11/1999 | Lee et al. | |
| 6,189,079 B1 | 2/2001 | Micka et al. | |
| 6,499,112 B1 | 12/2002 | Milillo et al. | |
| 6,502,205 B1 * | 12/2002 | Yanai et al. | 714/6.32 |
| 6,591,351 B1 | 7/2003 | Urabe et al. | |
| 6,601,187 B1 | 7/2003 | Sicola et al. | |
| 6,615,223 B1 * | 9/2003 | Shih et al. | 707/625 |
| 2002/0073276 A1 | 6/2002 | Howard et al. | |
| 2003/0051111 A1 | 3/2003 | Nakano et al. | |
| 2003/0074602 A1 | 4/2003 | Lomet et al. | |
| 2003/0093620 A1 | 5/2003 | Huxoll | |
| 2003/0126133 A1 | 7/2003 | Dattatri et al. | |
| 2004/0193658 A1 * | 9/2004 | Kawamura et al. | 707/202 |

OTHER PUBLICATIONS

IBM Technical Disclosure Bulletin, "Recovery From System Crash During File Creation Using Write Head Logging," vol. 32, No. 3A, Aug. 1989.
F.E. Levine, "Minimize CPU Utilization for Buffer Pool Status Update When Calculating Minimum Log Sequence Number Values on a Buffer," Research Disclosure, Mar. 1989 No. 299.
T. Niklander, et al., "Using Logs to Increase Availability in Real-Time Main-Memory Database."
"Integrated CRC for Sector Buffer Memory and Disk Data," Research Disclosure, IBM Disclosure 409103, p. 616, May 1998.

* cited by examiner

*Primary Examiner* — Apu Mofiz
*Assistant Examiner* — Chelcie Daye
(74) *Attorney, Agent, or Firm* — Joseph P. Curtin

(57) ABSTRACT

Database content changes are asynchronously remotely copied from a primary site to a remote site by associating sequential identification with each respective log record write and each corresponding data record write received at the primary site. Each respective log record write is asynchronously remotely copied from the primary site to the remote site, and an acknowledgement corresponding to a log record write that has been completed at the remote site is received at the primary site. Each data record write having a sequential identification that is prior to or equal to the sequential identification of the log record write corresponding to the received acknowledgement is then asynchronously remotely copied to the remote site. A log record write is asynchronously remotely copied from the primary site to the remote site before a data record write is asynchronously remotely copied from the primary site to the remote site.

24 Claims, 4 Drawing Sheets

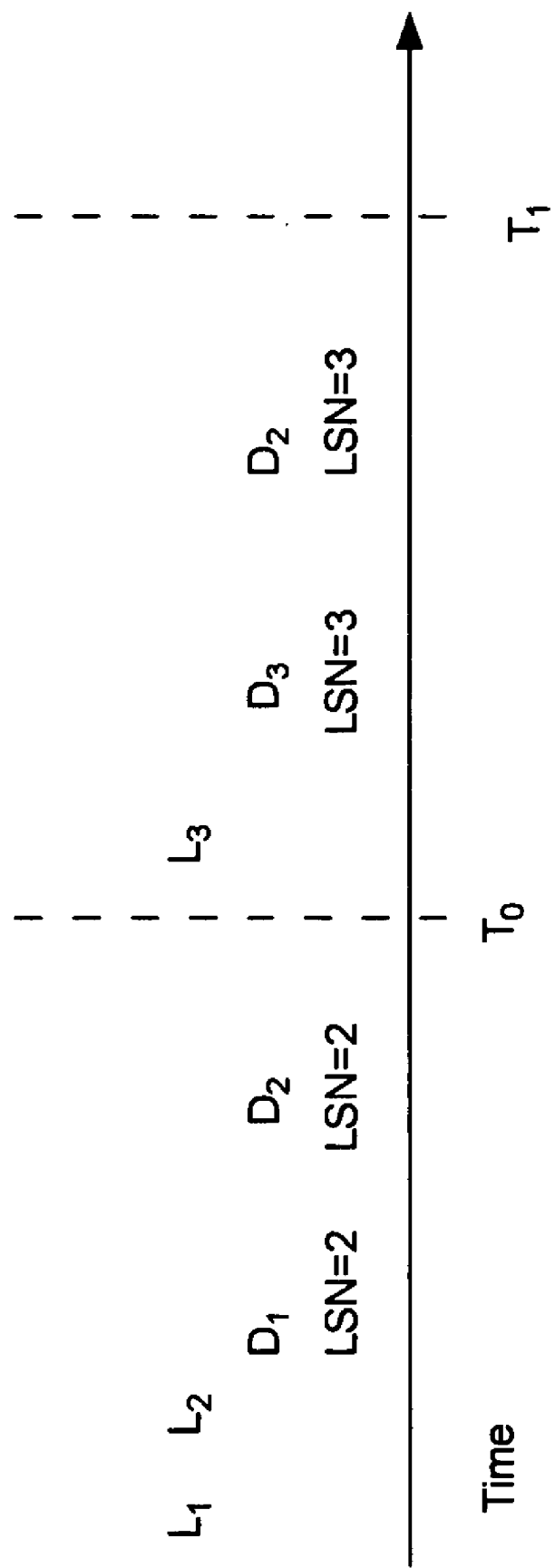

HIGH-PERFORMANCE ASYNCHRONOUS PEER-TO-PEER REMOTE COPY FOR DATABASES

BACKGROUND OF THE INVENTION

1. Field of the Invention

The present invention relates to distributed databases. More specifically, the present invention relates to a technique for performing an asynchronously remotely copy of a distributed database.

2. Description of the Related Art

Basic business of banks and stock broker companies have shifted from centralized computerized database system to a distributed database system to ensure business continuance in the event of a disaster, such as an earthquake or fire at a data center. Duplication of primary database, or primary peer, to a secondary database, or secondary peer, is performed using either a synchronous or an asynchronous peer-to-peer remote copy operation.

In synchronous peer-to-peer remote copy operation (or synchronous remote copy) the write response is degraded because each write to the primary peer must be sent to a remote peer before the write can be acknowledged back to the primary peer by the secondary peer. An asynchronous peer-to-peer remote copy operation (or asynchronous remote copy) avoids a degraded write response time experienced by a synchronous remote copy by acknowledging a write to the primary peer before the write is sent to the remote peer. The write is subsequently sent to the secondary peer as a background operation. While an asynchronous remote copy addresses the latency problem associated with a synchronous remote copy, an asynchronous remote copy introduces a write reordering problem that can affect the correctness of applications, such as databases.

Databases, such as DB2, Oracle and MS Sql server, require that a log record describing modifications to a page be on disk before the modified page reaches disk. An asynchronous remote copy operation can violate this invariant because write caches do not track the order of writes. Thus, the remote copy may be undesirably inconsistent with the primary copy. Consequently, an intermediate solution is applied in which a log volume is synchronously copied while other volumes are asynchronously copied, thereby ensuring that database consistency. An undesirably degraded write performance for log volumes remains, however, that governs the end performance of the database application.

Consequently, what is needed is a technique for asynchronously remotely copying database content changes from a primary site to a remote site while ensuring that the invariant desired by certain databases be maintained.

BRIEF SUMMARY OF THE INVENTION

The present invention provides a technique for asynchronously remotely copying database content changes from a primary site to a remote site while ensuring that the invariant desired by certain databases be maintained.

The advantages of the present invention are provided by a system and method for asynchronously remotely copying database content changes from a primary site to a remote site. According to the present invention, a sequential identification, such as a monotonically increasing identification number or a monotonically increasing time-stamp identification, is associated with each respective log record write and each corresponding data record write received at the primary site. Each respective log record write is asynchronously remotely copied from the primary site to the remote site, and an acknowledgement corresponding to a log record write that has been completed at the remote site is received at the primary site. Each data record write having a sequential identification that is prior to or equal to the sequential identification of the log record write corresponding to the received acknowledgement is then asynchronously remotely copied to the remote site. A log record write is asynchronously remotely copied from the primary site to the remote site before a data record write is asynchronously remotely copied from the primary site to the remote site. At the remote site, a log record write is asynchronously received and stored. The acknowledgement is sent from the remote site to the primary site when the received log record write is complete. Subsequently, a data record write is asynchronously received at the remote site from the primary site and is stored.

BRIEF DESCRIPTION OF THE DRAWINGS

The present invention is illustrated by way of example and not by limitation in the accompanying figures in which like reference numerals indicate similar elements and in which:

FIG. 4 shows an exemplary sequence of log record L and data block D writes illustrating the present invention.

DETAILED DESCRIPTION OF THE INVENTION

The present invention provides a storage system cache management technique that is particularly suitable for applications, such as databases. In that regard, the present invention provides a write performance corresponding to an asynchronously remote copy for log volumes as well as for data pages, while ensuring that the invariant desired by certain databases, such as DB2, be maintained.

Figure 1:
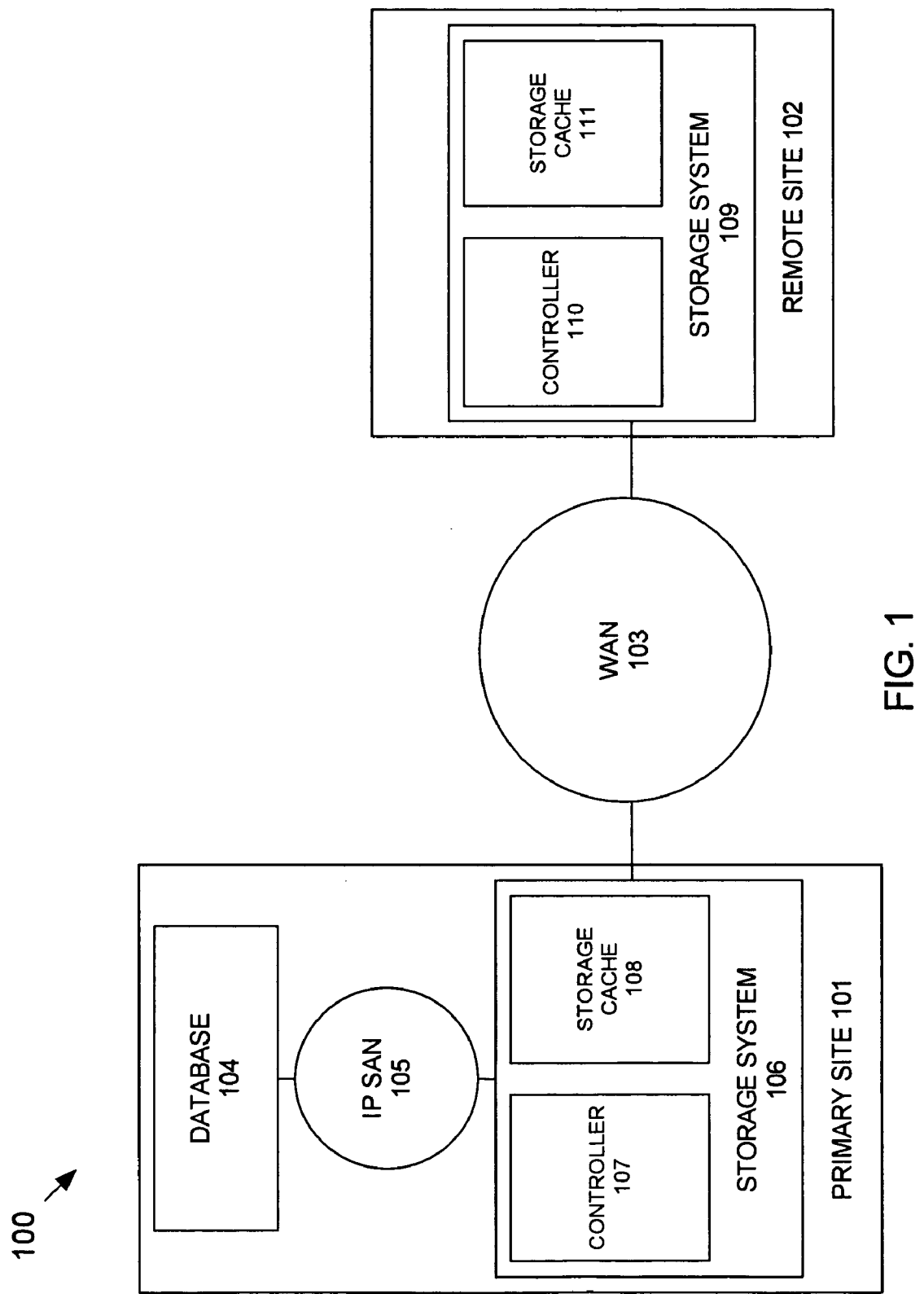
FIG. 1 shows a functional block diagram of an exemplary distributed database system that can utilize the storage system cache management technique according to the present invention.

FIG. 1 shows a functional block diagram of an exemplary distributed database system 100 that can utilize the storage system cache management technique according to the present invention. Distributed database system 100 includes a primary site 101 that is coupled at least one remote site 102 over a telecommunications network, such as WAN 103 or the Internet. While only one remote site 102 is shown in FIG. 1, but it should be understood that distributed database system 100 can include more than one remote site. Primary site 101 includes an application, such as a database 104, an IP Storage Area Network (SAN) 105 and a storage system 106. Storage system 106 includes at least one mass storage device (not shown), such as a Hard Disk Drive (HDD), a controller 107 that informs a storage cache 108 about the volumes and files forming log and data volumes associated with database 104. Remote site 102 includes a storage system 109. Storage system 109 includes at least one mass storage device (not shown), such as an HDD, a controller 110 and a storage cache 111. Storage systems 106 and 109 each separately store log records and data records.

Essentially, an ideal approach for a remote copy for an application, such as a database, would be to perform a remote copy of log records in an asynchronous FIFO order and for each data record, keep information about the log volume relating to the data record. Once a log record has been copied remotely, all data records that were constrained by the remotely copied log records can be remotely copied. Thus, the invariant desired by certain databases is maintained, while ensuring that the log volume does not incur the overhead of a synchronous remote copy. Consequently, an ideal approach would require that the cache for log volumes be FIFO and the cache blocks for data pages contain some additional information about the constraining log record.

To achieve the ideal approach, the present invention maintains a monotonically increasing four-byte counter $L_{max}$ for log records. The $L_{max}$ counter is incremented for each log record write. The $L_{max}$ counter value at the time of any log record write is kept in the state of the buffer. Log records are remotely copied in the order of the $L_{max}$ counter value contained in the buffer. Another counter $L_{min}$ is maintained for tracking each log record that has been acknowledged by the remote peer. The remote copy process for data records copies all of the data records that have at most $L_{min}$ counter value. Alternatively, each log record write can be associated with a real-time value. The real-time value at the time of any log record write is kept in the state of the buffer and the log records are remotely copied in the order according to their respective time stamps. A register is maintained for tracking each log record that has been acknowledged by the remote peer and all data records corresponding to acknowledged log writes are remotely copied.

Figure 2:
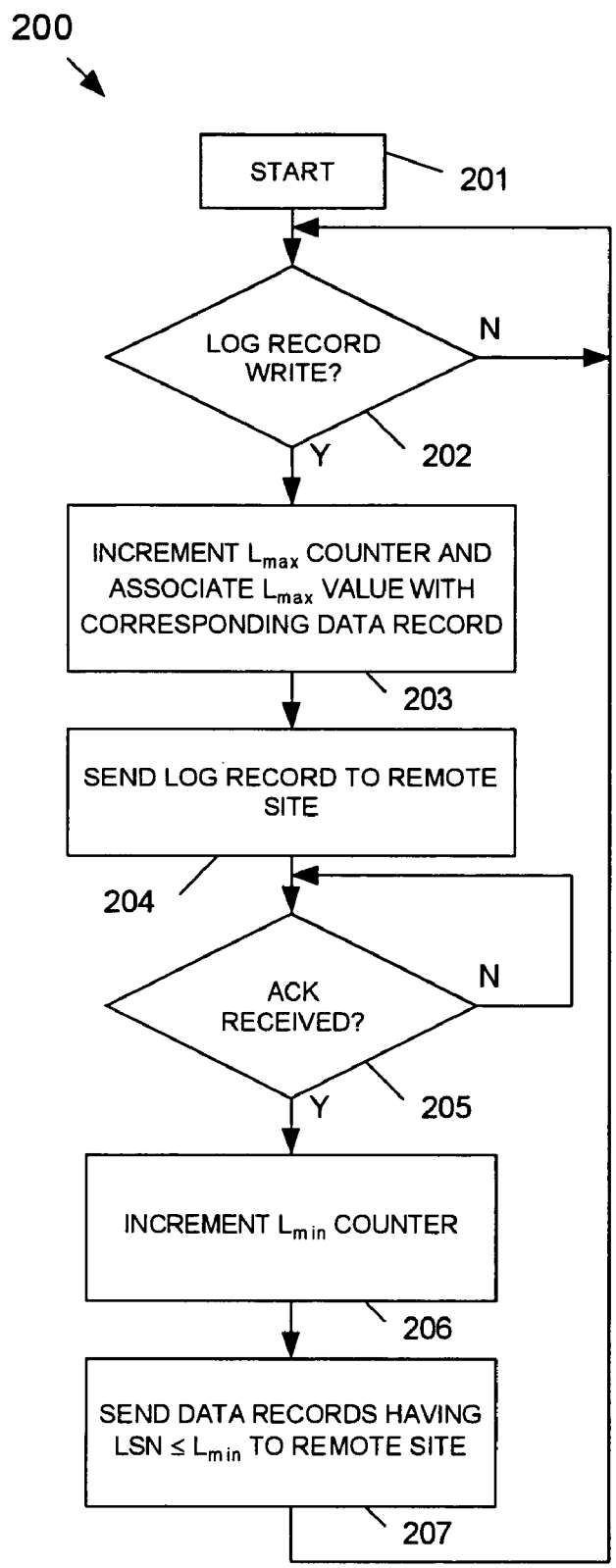
FIG. 2 is a flowchart of a process at a primary site according to the present invention for providing a write performance corresponding to an asynchronously remote copy for log volumes and data pages according to the present invention.
Figure 3:
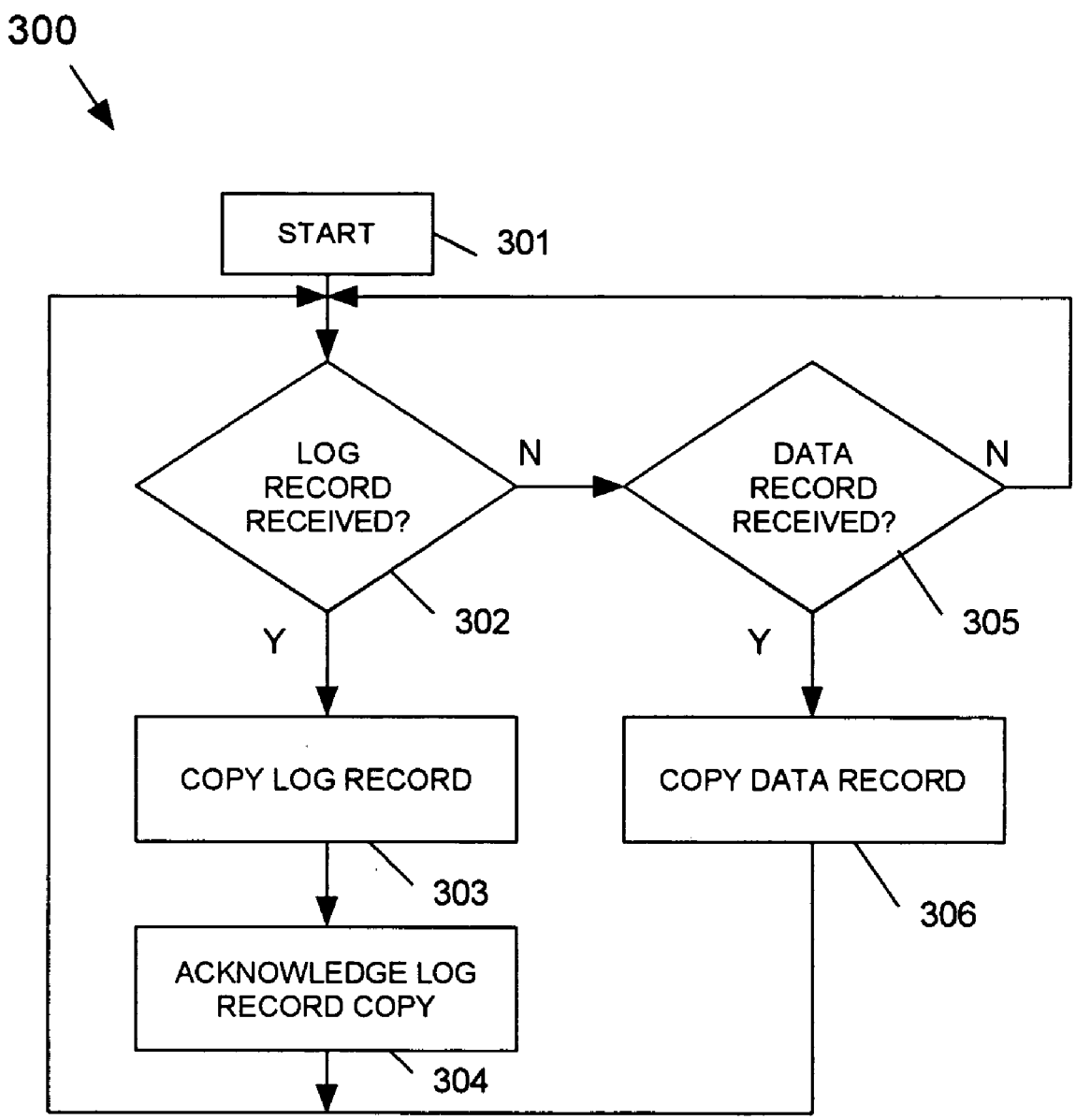
FIG. 3 is a flowchart of a process at a primary site according to the present invention for providing a write performance corresponding to an asynchronously remote copy for log volumes and data pages according to the present invention.

FIG. 2 is a flowchart of a process 200 at a primary site 101 according to the present invention for providing a write performance corresponding to an asynchronously remote copy for log volumes and data pages according to the present invention. FIG. 3 is a flowchart of a process 300 at a remote site 102 according to the present invention for providing a write performance corresponding to an asynchronously remote copy for log volumes and data pages according to the present invention.

The process at primary site 101 begins at step 201. At step 202, it is determined whether a log record write has occurred. If not, flow remains at step 202 until a log record write occurs. When a log record write occurs, flow continues to step 203 where the $L_{max}$ counter is incremented and the incremented value is associated with a corresponding data record write. Flow continues to step 204 where a copy of the log record write is sent to remote site 102. Flow continues to step 205 where it is determined whether remote site 102 has acknowledged the remote copy of the log record. Flow remains at step 205 until remote site 102 has acknowledged the remote copy of the log record. A timeout function (not shown) can be instituted that returns flow to step 204 if acknowledgement of the remote copy has not been received after a predetermined period of time.

When primary site 101 receives acknowledge of the remote copy of the log record, flow continues to step 206 where the $L_{min}$ counter is incremented. Flow continues to step 207 where data records having a Log Sequence Number (LSN) that are less than or equal to $L_{min}$ are sent to remote site 102 for remote copy.

In FIG. 3, the process begins for remote site 102 at step 301. At step 302, it is determined whether a log record remote copy has been received. If so, flow continues to step 303 where the remote copy is completed. At step 304, the remote copy of the log record is acknowledged back to primary site 101. Flow returns to step 302.

If, at step 302, a log record remote copy has not been received, low continues to step 305 where it is determined with a data record remote copy has been received. If a data record copy has been received at step 305, flow continues to step 306 where the data record copy is completed. Flow returns to step 302. If, at step 305, a data record has not been received, flow returns to step 302.

To further illustrate the technique of the present invention, FIG. 4 shows an exemplary sequence of log record L and data block D writes. The subscript for both the log records and the data blocks in FIG. 4 indicates a Block ID. The LSN values for each of the data blocks are as shown in FIG. 4. At time $T_0$, the LSN values for both $D_1$ and $D_2$ is 2. Consequently, both data blocks $D_1$ and $D_2$ can be remotely copied, but only after log records $L_1$ and $L_2$ have been copied to the remote site. At the time $T_1$, the respective LSN values for data pages $D_1$, $D_2$, and $D_3$ are 2, 3 and 3. Thus, data block $D_1$ can be copied after log record $L_2$ has been copied to the remote site. Data records $D_2$ and $D_3$ can only be copied to the remote site after log record $L_3$ has been remotely copied.

Although the foregoing invention has been described in some detail for purposes of clarity of understanding, it will be apparent that certain changes and modifications may be practiced that are within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for asynchronously remotely copying database content changes from a primary site to a remote site, the method comprising:
    associating a sequential identification with each respective log record write and each corresponding data record write received at the primary site, each data record write containing modifications to a page of the database and each log record write containing information describing modifications to the page of the database for a corresponding data record write;
    asynchronously remotely copying each respective log record write from the primary site to the remote site;
    receiving an acknowledgement at the primary site, the acknowledgement corresponding to a log record write that has been completed at the remote site; and
    asynchronously remotely copying each data record write having a sequential identification that is only prior to or equal to the sequential identification of the log record write corresponding to the received acknowledgement.

2. The method according to claim 1, wherein the sequential identification is a monotonically increasing identification number.

3. The method according to claim 1, wherein the sequential identification is a monotonically increasing time-stamp identification.

4. The method according to claim 1, wherein a log record write is asynchronously remotely copied from the primary site to the remote site before a data record write is asynchronously remotely copied from the primary site to the remote site.

5. The method according to claim 1, wherein each log record write is a log block and each data record write is a data block write.

6. The method according to claim 1, further comprising:
- asynchronously receiving a log record write at the remote site;
- storing the received log record write at the remote site;
- sending an acknowledgement from the remote site to the primary site when the received log record write is complete;
- asynchronously receiving a data record write at the remote site from the primary site; and
- storing the received data record write.

7. A method for asynchronously remotely coping database content changes occurring at a primary site at a remote site, the method comprising:
- asynchronously receiving a log record write at the remote site, each respective log record received at the remote site having an associated sequential identification and a corresponding data record write, each data record write containing modifications to a page of the database and each log record write containing information describing modifications to the page of the database for a corresponding data record write;
- storing the received log record write at the remote site;
- sending an acknowledgement from the remote site to the primary site when the received log record write is complete;
- asynchronously receiving a data record write at the remote site from the primary site, each received data record write having a sequential identification that is only prior to or equal to the sequential identification of the log record write corresponding to the received acknowledgement; and
- storing the received data record write.

8. The method according to claim 7, wherein the sequential identification is a monotonically increasing identification number.

9. The method according to claim 7, wherein the sequential identification is a monotonically increasing time-stamp identification.

10. A storage system for asynchronously remotely copying content changes stored in the storage system, the system comprising:
- a primary site having a storage system separately storing log records and data records;
- a remote site having a storage system separately storing log records and a data records,
- the primary site associating a sequential identification with each respective log record write and each corresponding data record write occurring at the primary site and asynchronously remotely copying each respective log record write from the primary site to the remote site, each data record write containing modifications to a page of the database and each log record write containing information describing modifications to the page of the database for a corresponding data record write, the remote site sending to the primary site an acknowledgement corresponding to a log record write that has been completed at the remote site, and the primary site asynchronously remotely copying to the remote site each data record write having a sequential identification that is only prior to or equal to the sequential identification of the log record write corresponding to the received acknowledgement.

11. The system according to claim 10, wherein the sequential identification is a monotonically increasing identification number.

12. The system according to claim 10, wherein the sequential identification is a monotonically increasing time-stamp identification.

13. The system according to claim 10, wherein a log record write is asynchronously remotely copied from the primary site to the remote site before a data record write is asynchronously remotely copied from the primary site to the remote site.

14. The method according to claim 10, wherein each log record write is a log block and each data record write is a data block write.

15. A primary site of a distributed storage system, the system comprising:
- a storage system separately storing log records and data records, each data record write containing modifications to a page of the database and each log record write containing information describing modifications to the page of the database for a corresponding data record write; and
- a controller associating a sequential identification with each respective log record write and each corresponding data record write occurring at the primary site and asynchronously remotely copying each respective log record write from the primary site to a remote site, the controller receiving an acknowledgement corresponding to a log record write that has been completed at the remote site and, in response, asynchronously remotely copying to the remote site each data record write having a sequential identification that is only prior to or equal to the sequential identification of the log record write corresponding to the received acknowledgement.

16. The system according to claim 15, wherein the sequential identification is a monotonically increasing identification number.

17. The system according to claim 15, wherein the sequential identification is a monotonically increasing time-stamp identification.

18. The system according to claim 15, wherein a log record write is asynchronously remotely copied from the primary site to the remote site before a data record write is asynchronously remotely copied from the primary site to the remote site.

19. The method according to claim 15, wherein each log record write is a log block and each data record write is a data block write.

20. A remote site of a distributed storage system, the system comprising:
- a storage system separately storing log records and data records, each data record write containing modifications to a page of the database and each log record write containing information describing modifications to the page of the database for a corresponding data record write,
- a controller asynchronously receiving a log record write from a primary site, each respective log record received at the remote site having an associated sequential identification and a corresponding data record write, storing the received log record write in the storage system and sending an acknowledgement from the remote site to the primary site when the received log record write is complete, the controller further asynchronously receiving a data record write from the primary site, each received data record write comprising a sequential identification that is only prior to or equal to the sequential identification of the log record write corresponding to the received acknowledgement, and storing the received data record write.

21. The remote site according to claim 20, wherein the sequential identification is a monotonically increasing identification number.

22. The remote site according to claim 20, wherein the sequential identification is a monotonically increasing timestamp identification.

23. The remote site according to claim 20, wherein a log record write is asynchronously remotely copied from the primary site to the remote site before a data record write is asynchronously remotely copied from the primary site to the remote site.

24. The remote site according to claim 20, wherein each log record write is a log block and each data record write is a data block write.

* * * * *